United States Patent
Oka et al.

(10) Patent No.: US 10,951,079 B2
(45) Date of Patent: Mar. 16, 2021

(54) COIL FOR ROTARY ELECTRIC MACHINE

(71) Applicant: HONDA MOTOR CO., LTD., Tokyo (JP)

(72) Inventors: Keiichiro Oka, Tochigi (JP); Kenichi Omagari, Tochigi (JP); Takahiro Ide, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/263,186

(22) Filed: Jan. 31, 2019

(65) Prior Publication Data
US 2019/0260249 A1 Aug. 22, 2019

(30) Foreign Application Priority Data
Feb. 19, 2018 (JP) .............................. JP2018-026665

(51) Int. Cl.
| H02K 3/12 | (2006.01) |
| H02K 15/04 | (2006.01) |
| H02K 1/16 | (2006.01) |
| H02K 1/32 | (2006.01) |
| H02K 3/28 | (2006.01) |
| H02K 3/14 | (2006.01) |
| H02K 3/48 | (2006.01) |

(52) U.S. Cl.
CPC .............. *H02K 3/12* (2013.01); *H02K 1/16* (2013.01); *H02K 1/32* (2013.01); *H02K 3/14* (2013.01); *H02K 3/28* (2013.01); *H02K 15/0478* (2013.01); *H02K 3/48* (2013.01); *H02K 2213/03* (2013.01)

(58) Field of Classification Search
CPC .. H02K 3/12; H02K 3/14; H02K 3/48; H02K 1/16; H02K 1/32

USPC ........................................................ 310/207
See application file for complete search history.

(56) References Cited

U.S. PATENT DOCUMENTS

| 2004/0119362 A1 | 6/2004 | Neet |
| 2009/0096311 A1 | 4/2009 | Even |
| 2017/0324286 A1 | 11/2017 | Akimoto et al. |

FOREIGN PATENT DOCUMENTS

| CN | 101084618 A | 12/2007 |
| JP | 2000-139051 | 5/2000 |
| JP | 2004-282996 | 10/2004 |
| JP | 2013-138594 | 7/2013 |
| JP | 2013-243904 | 12/2013 |
| JP | 2014-007938 | 1/2014 |
| JP | 2015-126630 | 7/2015 |
| JP | 2016-92997 | 5/2016 |

OTHER PUBLICATIONS

Japanese Office Action dated Nov. 12, 2019, 3 pages.
Chinese Office Action dated Aug. 3, 2020, 9 pages.

*Primary Examiner* — Terrance L Kenerly
(74) *Attorney, Agent, or Firm* — Rankin, Hill & Clark LLP

(57) ABSTRACT

A coil for a rotary electric machine is mounted in a plurality of slots of a stator core having the slots in a circumferential direction. An overlapping coil-type wave winding coil constituted by a coil wire having a plurality of slot accommodating portions accommodated in the slots and a plurality of coil end portions interconnecting, in a chevron shape, the slot accommodating portions next to each other outside the slots in an axial direction of the stator core constitutes the coil. At least two layers of the coil wire are connected by a continuous wire-based connecting portion, folded back in the connecting portion, and stacked.

7 Claims, 20 Drawing Sheets

COIL FOR ROTARY ELECTRIC MACHINE

This application is based on and claims the benefit of priority from Japanese Patent Application No. 2018-026665, filed on 19 Feb. 2018, the content of which is incorporated herein by reference.

BACKGROUND OF THE INVENTION

Field of the Invention

The present invention relates to a coil for a rotary electric machine. Specifically, the present invention relates to a coil for a rotary electric machine constituted by an overlapping coil-type wave winding coil.

Related Art

A wave winding coil is known in the related art as a coil mounted in slots of a stator core of a rotary electric machine such as an electric motor and a generator. The wave winding coil is configured in a wave shape by a coil wire that has slot accommodating portions accommodated in the slots and a coil end portion interconnecting, in a chevron shape, the end portions of the slot accommodating portions which are next to each other.

Regarding this wave winding coil, weaving- and overlapping coil-type disposition patterns are known as disposition patterns accommodated in the adjacent slots. In the weaving-type disposition pattern, the slot accommodating portions of the coil wire are alternately disposed in a first layer and a second layer. The overlapping coil-type disposition pattern is a pattern in which the slot accommodating portions of the coil wire are disposed in first layers and second layers (see, for example, Patent Documents 1 and 2). Of them, the overlapping coil-type pattern, in which the slot accommodating portions of the coil wire are disposed in the same layer in the slots, does not require weaving of a plurality of the coil wires, and thus is advantageous in that wave winding coil manufacturing can be expedited, damage to the coil wire can be reduced, and the like.

Patent Document 1: Japanese Unexamined Patent Application, Publication No. 2004-282996

Patent Document 2: Japanese Unexamined Patent Application, Publication No. 2016-92997

SUMMARY OF THE INVENTION

In a case where a coil for a rotary electric machine is made of an overlapping coil-type wave winding coil and the wave winding coil of each layer accommodated in the slot is configured in a substantially spiral shape by being connected for circumferential connection, the total length of the wave winding coil before molding in the substantially spiral shape increases, which results in an increase in the size of a wave winding coil transport device and an increase in transport distance. Then, a problem arises in the form of time-consuming transport.

In addition, in the overlapping coil-type wave winding coil according to the related art, the stacked coil wires are simply layered without being integrated by weaving or the like, and thus a problem arises as the coil wires are scattered during transport.

A step of molding the overlapping coil-type wave winding coil in a substantially spiral shape includes, for example, a manufacturing method for sequential winding from the wave winding coil that constitutes the innermost layer. Still, the overlapping coil-type wave winding coil according to the related art lacks integration based on coil wire intertwining unlike a woven coil-type coil, and thus has a problem in that each coil wire is scattered or deformed by tension during winding.

In this regard, an object of the present invention is to provide a coil for a rotary electric machine based on an overlapping coil-type wave winding coil, which is an overlapping coil-type wave winding coil yet facilitates coil handling including transport by means of a compact pre-annular molding total length and allows each coil wire to be easily incorporated into a slot.

(1) A coil for a rotary electric machine according to the present invention is a coil for a rotary electric machine (such as a coil 100 to be described later) mounted in a plurality of slots (such as slots 201 to be described later) of a stator core (such as a stator core 200 to be described later) having the slots in a circumferential direction. An overlapping coil-type wave winding coil constituted by a coil wire (such as a coil wire 1 to be described later) having a plurality of slot accommodating portions (such as slot accommodating portions 11 to be described later) accommodated in the slots and a plurality of coil end portions (such as coil end portions 12 to be described later) interconnecting the slot accommodating portions next to each other outside the slots in an axial direction of the stator core constitutes the coil. At least two layers (such as layers 10 to 60 to be described later) of the coil wire are connected by a continuous wire-based connecting portion (such as a connecting portion 15 to be described later), folded back in the connecting portion, and stacked. A stacking configuration in which the overlapping coil-type wave winding coil is folded back and stacked results from (1), and thus the total length of the wave winding coil before annular molding can be compact. As a result, the size of a transport device transporting the coil can be reduced, handling of the coil can be facilitated, and each coil wire can be easily incorporated into the slot.

(2) Preferably, in the coil for a rotary electric machine according to (1), the layers are constituted by a plurality of the coil wires being sequentially stacked, and a stacking order of the plurality of coil wires between the layers next to each other is reversed and the plurality of coil wires are folded back with the stacking order maintained in the connecting portion. As a result of (2), the wave winding coil stacked in the plurality of layers can be easily manufactured by sequential insertion of each previously folded coil wire from a folding direction.

(3) Preferably, in the coil for a rotary electric machine according to (1) or (2), a top portion (such as a top portion 122 to be described later) of the coil end portion of the coil wire constituting the layer disposed on a radial-direction outside of the stator core is higher in the axial direction of the stator core than a top portion of the coil end portion of the coil wire constituting the layer disposed on a radial-direction inside of the stator core. As a result of (3), the coil end heights of the layer disposed on the radial-direction outside of the stator core and the layer disposed on the radial-direction inside of the stator core can be easily aligned after annular molding even with the intervals of the slot accommodating portions before the annular molding evenly aligned.

(4) Preferably, in the coil for a rotary electric machine according to any one of (1) to (3), an interval between the adjacent slot accommodating portions of the coil wire is shorter in the layer disposed on the radial-direction inside of the stator core than in the layer disposed on the radial-direction outside of the stator core. As a result of (4), the circumferential lengths of the coil wire disposed on the radial-direction outside of the stator core and the coil wire disposed on the radial-direction inside of the stator core can be easily aligned.

(5) Preferably, in the coil for a rotary electric machine according to (4), the interval of the slot accommodating portion in a vicinity of the folded part of the coil wire is smaller than the interval of the slot accommodating portion at a part other than the vicinity of the folded part of the coil wire. As a result of (5), in the folded coil wire, the circumferential lengths of the coil wire disposed on the outer peripheral side of the stator core and the coil wire disposed on the inner peripheral side of the stator core can be easily aligned in a state where the central position of each layer is aligned.

(6) Preferably, in the coil for a rotary electric machine according to any one of (1) to (5), each layer of the coil wire is stacked by shifting by a plurality of slots in the same direction along the circumferential direction of the stator core. As a result of (6), a stepwise end portion shape is achieved without the end portions resulting in a complicated structure when the manufactured coil is annularly rounded, and thus annular formation can be performed by simple inter-end portion stacking.

(7) Preferably, in the coil for a rotary electric machine according to any one of (1) to (6), the coil wire over each layer (such as the layers 10 to 60 to be described later) is a continuous wire. As a result of (7), the entire coil can be manufactured with one continuous wire, and thus the number of joints can be minimized with no limitation and manufacturing processes can be simplified.

(8) Preferably, in the coil for a rotary electric machine according to any one of (1) to (7), wires (such as wires 1*a* to 1*c* to be described later) divided in the circumferential direction of the stator core constitute the coil wire. As a result of (8), the coil can be easily deformed when the coil is deformed in the circumferential direction so that the manufactured coil is inserted into the slot from the inner diameter side of the stator core.

With the present invention, it is possible to provide a coil for a rotary electric machine based on an overlapping coil-type wave winding coil, which is an overlapping coil-type wave winding coil yet facilitates wave winding coil handling including transport by means of a compact pre-annular molding total length and allows each coil wire to be easily incorporated into a slot.

DETAILED DESCRIPTION OF THE INVENTION

Figure 1:
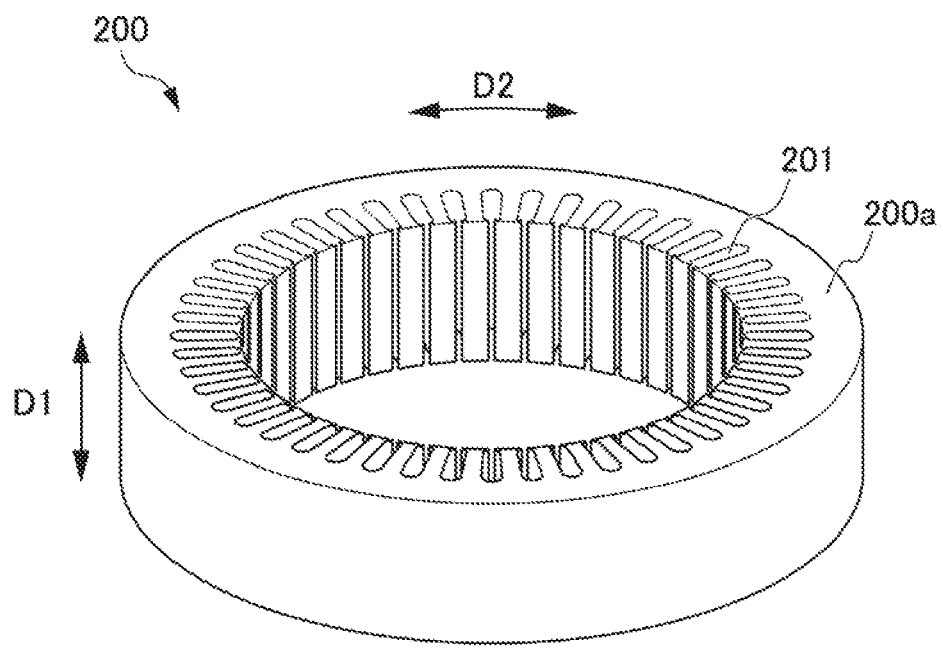
FIG. 1 is a perspective view illustrating a stator core in which a coil for a rotary electric machine according to the present invention is mounted.

Hereinafter, an embodiment of the present invention will be described in detail with reference to accompanying drawings. FIG. 1 is a perspective view illustrating a stator core in which a coil for a rotary electric machine according to the present invention is mounted. A stator core 200 of the present embodiment is formed in a cylindrical shape and has a plurality of slots 201 in which a coil 100 (described later) is mounted in the inner peripheral side of the stator core 200. Each slot 201 penetrates the stator core 200 in the axial direction of the stator core 200 (D1 direction in FIG. 1) and has a shape open inwards in the radial direction (radial direction orthogonal to the D1 direction in FIG. 1). The stator core 200 of the present embodiment has 48 slots 201 that are radially arranged and constitutes a 48-slot stator by the coil 100 (described later) being mounted over each slot 201.

Figure 2:
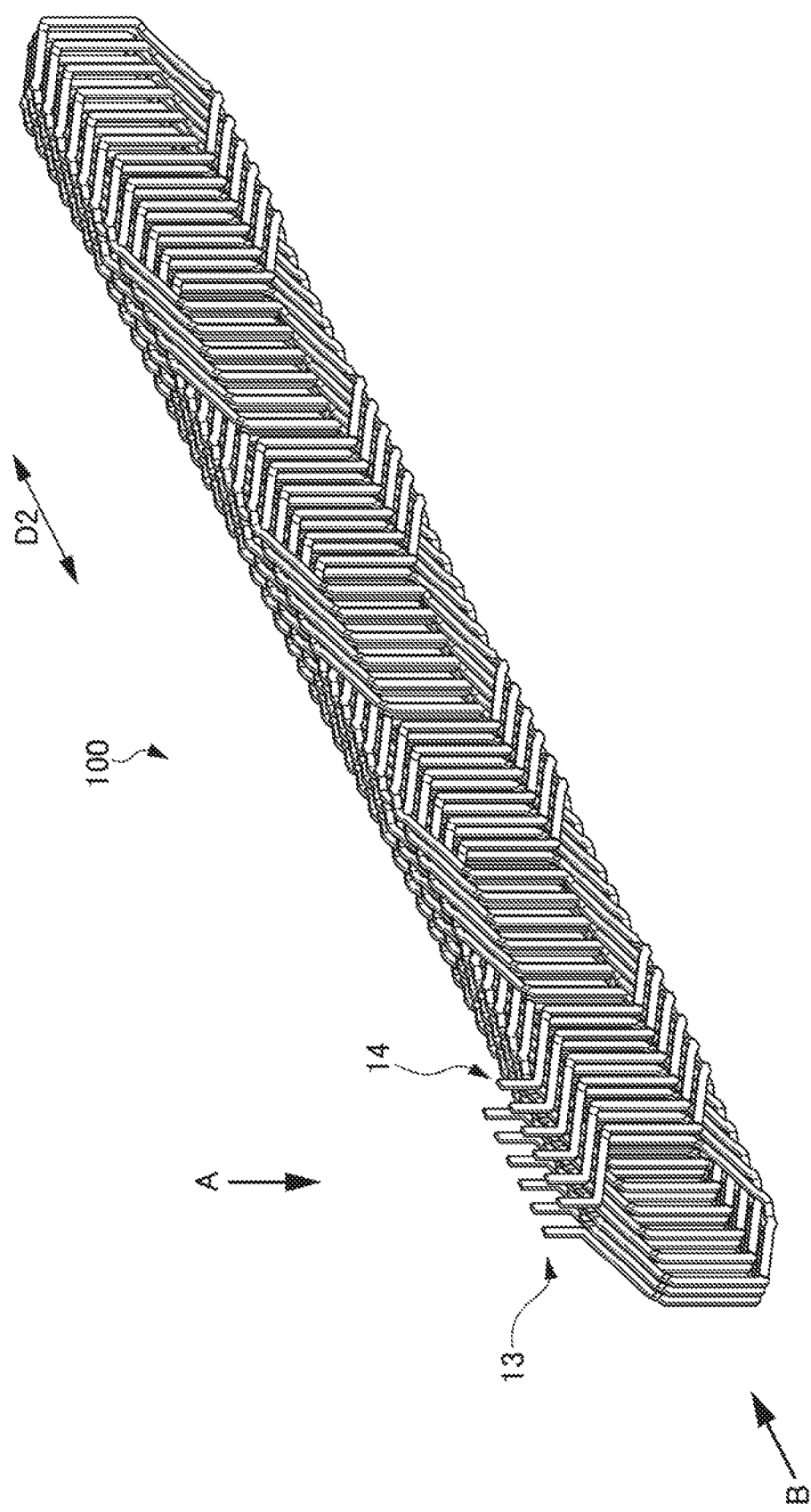
FIG. 2 is a perspective view illustrating an embodiment of the coil for a rotary electric machine, in which the coil is extended in a flat sheet shape before mounting in the stator core.
Figure 3:
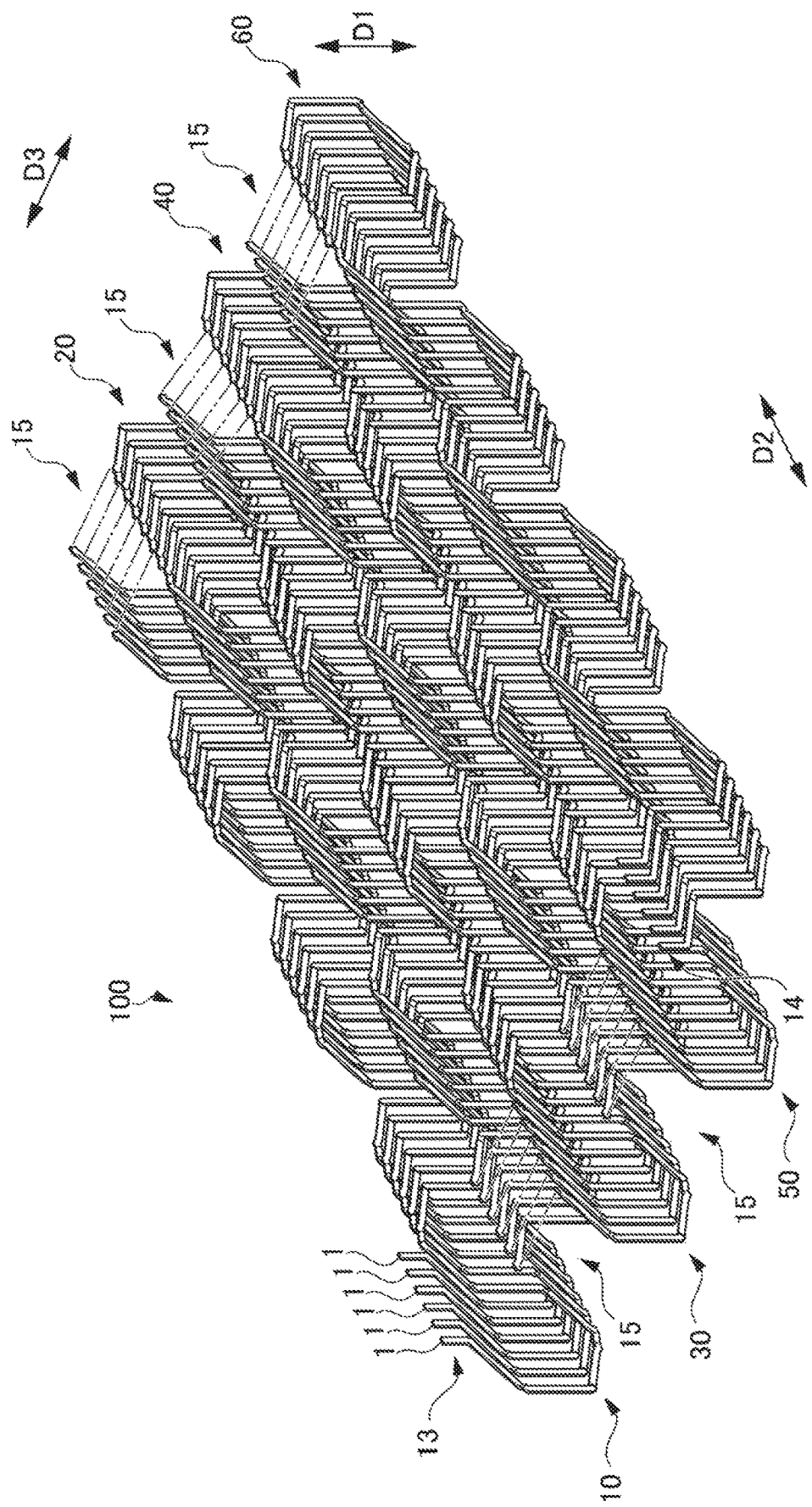
FIG. 3 is an exploded perspective view illustrating the coil for a rotary electric machine illustrated in FIG. 2.
Figure 4:
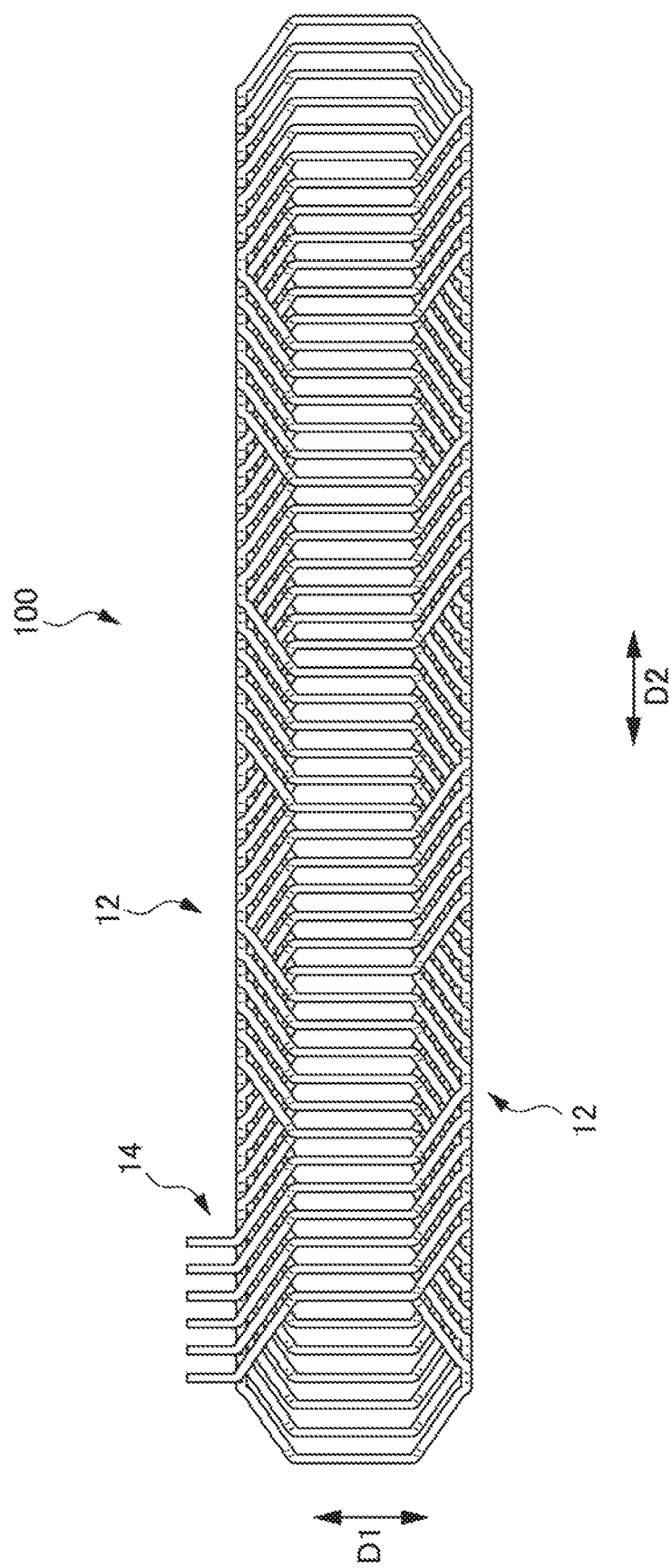
FIG. 4 is a front view of the coil for a rotary electric machine illustrated in FIG. 2.
Figure 5:
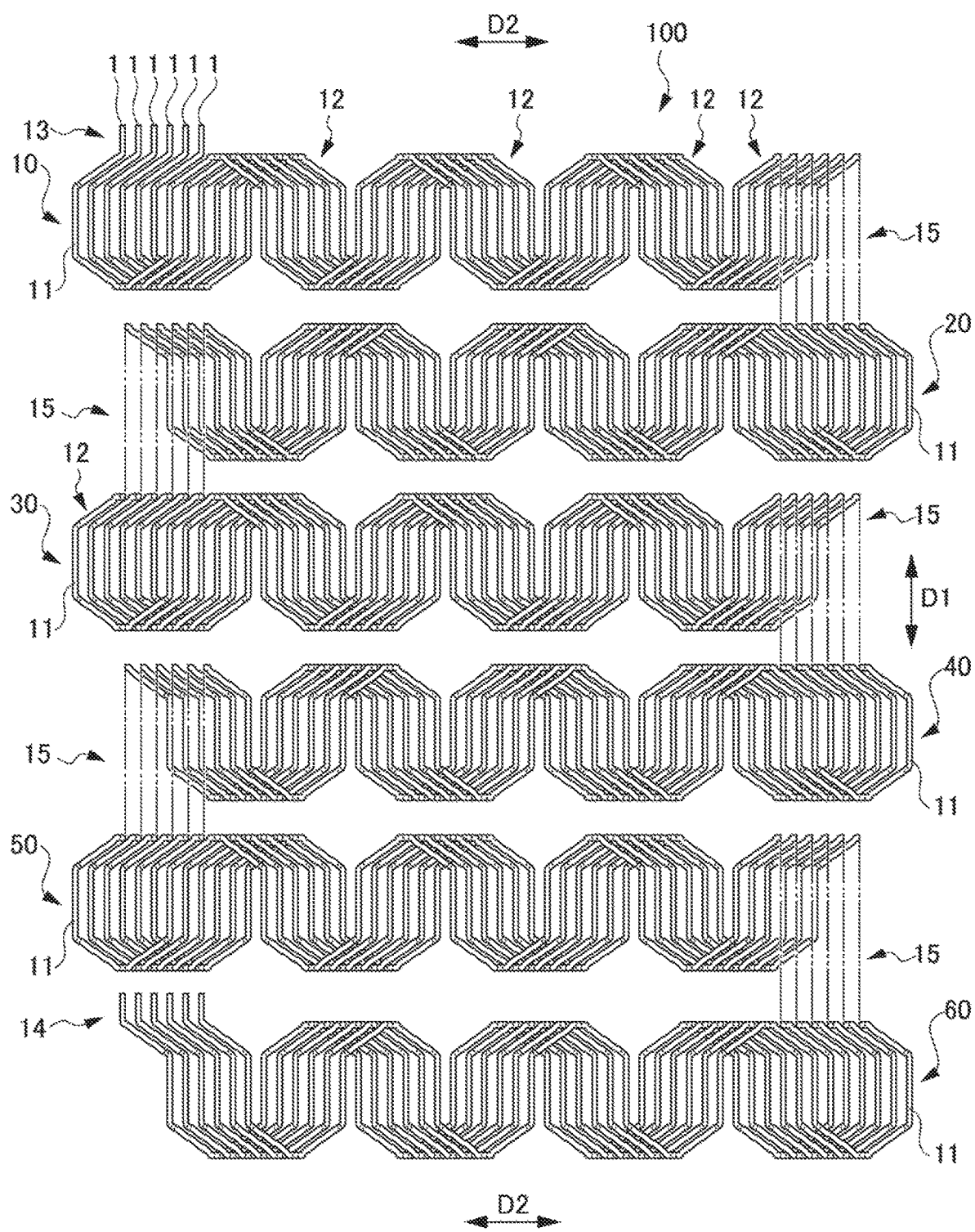
FIG. 5 is an exploded front view illustrating the coil for a rotary electric machine illustrated in FIG. 4.
Figure 6:
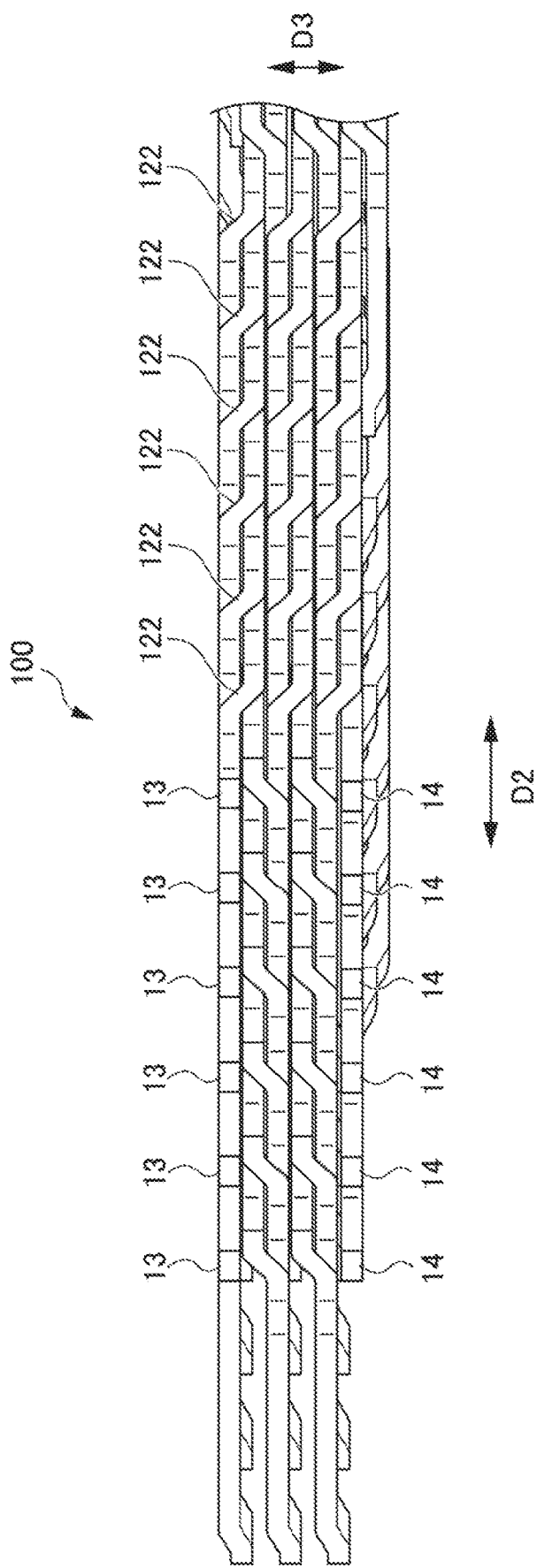
FIG. 6 is a partial plan view of an A portion of the coil for a rotary electric machine illustrated in FIG. 2.
Figure 7:
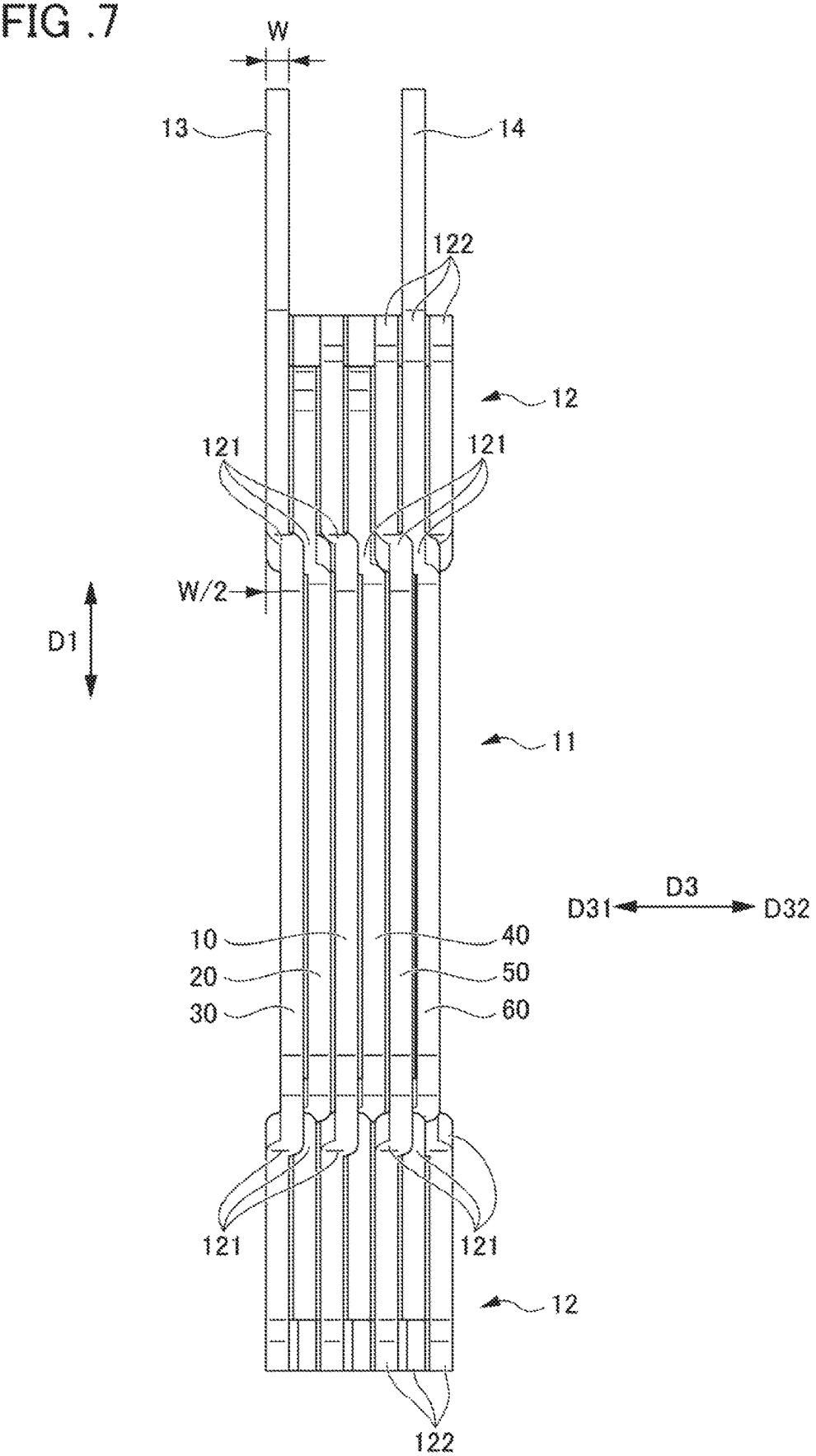
FIG. 7 is a side view in which the coil for a rotary electric machine illustrated in FIG. 2 is viewed from a B direction.

Next, the coil 100 for a rotary electric machine (hereinafter, simply referred to as the coil 100) mounted in the stator core 200 will be described. FIG. 2 is a perspective view illustrating an embodiment of the coil 100, in which the coil 100 is extended in a flat sheet shape before mounting in the stator core 200, and FIG. 3 is an exploded perspective view illustrating the coil 100 illustrated in FIG. 2. FIG. 4 is a front view of the coil 100 illustrated in FIG. 2, and FIG. 5 is an exploded front view illustrating the coil 100 illustrated in FIG. 4. FIG. 6 is a partial plan view of an A portion of the coil 100 illustrated in FIG. 2, and FIG. 7 is a side view in which the coil 100 illustrated in FIG. 2 is viewed from a B direction.

As illustrated in FIGS. 3 and 5, the coil 100 of the present embodiment has a six-layer structure that has layers 10 to 60 by coil wires 1, each of which is molded in a predetermined wave shape, being folded back in a zigzag manner and sequentially stacked. The coil 100 is constituted by six coil wires 1, each of which is molded in a wave shape, being arranged to be shifted by a predetermined pitch in a circumferential direction of the stator core 200 (D2 direction). Specifically, the predetermined pitch refers to the arrangement pitch of the slot 201 of the stator core 200.

Figure 8:
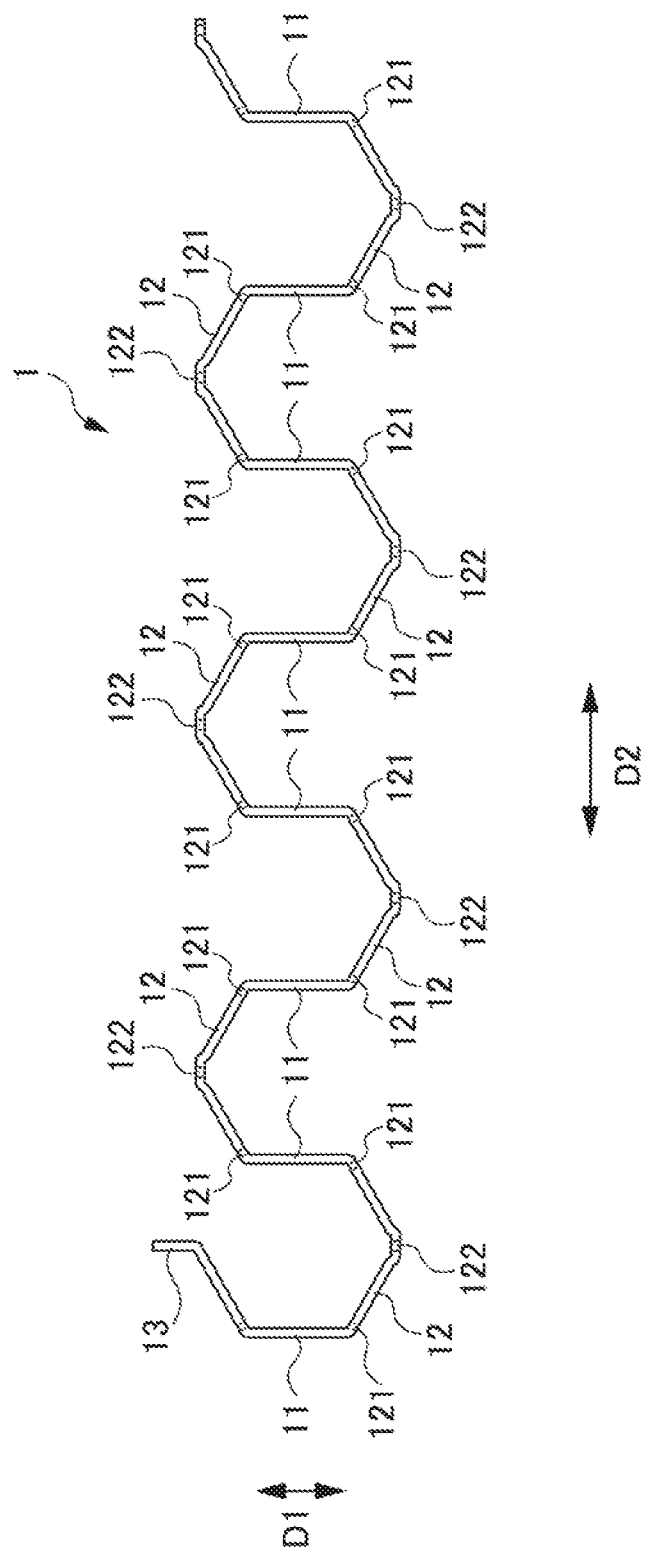
FIG. 8 is a front view illustrating one coil wire in the layer of the coil for a rotary electric machine illustrated in FIGS. 3 and 5.

Here, the coil wire 1 constituting the coil 100 will be described. FIG. 8 is a front view illustrating one coil wire 1 of the layer 10 of the coil 100 illustrated in FIGS. 3 and 5. The coil wire 1 is formed into a long wave shape by a rectangular wire that has a conductor having a rectangular cross section and formed of copper, aluminum, or the like and an insulating coating covering the outer surface of the conductor. The coil wire 1 has a plurality of slot accommodating portions 11 disposed in parallel at a predetermined interval in the circumferential direction of the stator core 200 (D2 direction) and a plurality of coil end portions 12, each of which interconnects the adjacent slot accommodating portions 11 in a chevron shape. In the coil wire 1 according to the present embodiment, eight slot accommodating portions 11 are disposed in parallel at an interval of five slots between the slot accommodating portions 11, and the end portions of the eight slot accommodating portions 11 are alternately interconnected by seven coil end portions 12.

The slot accommodating portion 11 is a part accommodated in the slot 201 of the stator core 200 and is formed in a substantially straight shape so as to be along the axial direction of the stator core 200 (D1 direction). The coil end portion 12 is a part protruding outwards in the axial direction (D1 direction) from upper and lower end surfaces 200a (see FIG. 1) of the slot 201 of the stator core 200 and interconnects the adjacent slot accommodating portions 11 by bending the upper and lower end portion sides of each slot accommodating portion 11 in a chevron shape. The coil end portion 12 alternately connects the upper end portion or the lower end portion of the slot accommodating portion 11 along the circumferential direction of the stator core 200 (D2 direction). Accordingly, one coil wire 1 is molded so as to undulate upwards and downwards across the slot accommodating portion 11.

The coil wire 1 has lead portions 13 and 14 in both end portions of the coil 100, respectively. The lead portions 13 and 14 are connected to the upper end portion of the slot accommodating portion 11 disposed in the end portion of the coil wire 1, extend obliquely upwards from the slot accommodating portion 11, and have end portions bent so as to rise along the axial direction of the stator core 200 (D1 direction).

Figure 9:
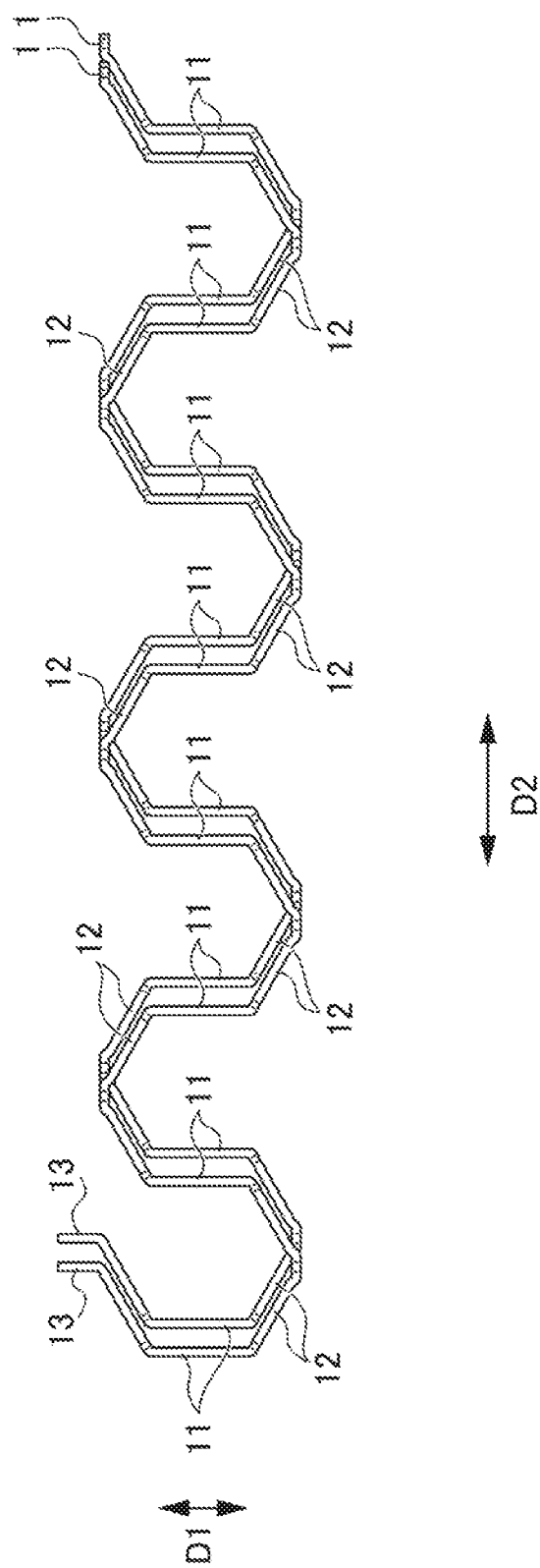
FIG. 9 is a diagram illustrating a state where two coil wires molded in the same wave shape are sequentially stacked side by side.

The coil 100 of the present embodiment is constituted by the similarly molded coil wires 1 being sequentially stacked side by side to be misaligned by a predetermined pitch in the circumferential direction of the stator core 200 (D2 direction) such that the slot accommodating portions 11 are parallel. Illustrated in FIG. 9 is a state where two coil wires 1 molded in the same wave shape are sequentially stacked side by side. The two coil wires 1 are stacked side by side such that the slot accommodating portions 11 are misaligned in the circumferential direction (D2 direction) by the arrangement pitch of the slot 201 of the stator core 200. Six coil wires 1 are sequentially arranged and stacked in the same manner, and then one layer 10 is obtained as illustrated in FIG. 10, in which 48 slot accommodating portions 11, the number being equal to the number of the slots 201 of the stator core 200, are disposed in parallel at the same pitch as the arrangement pitch of the slot 201.

Here, the configuration of the coil wire 1 will be further described. Each chevron-shaped coil end portion 12 of the coil wire 1 has a bent portion 121 bent and connected to each slot accommodating portion 11 and a chevron-shaped top portion 122 of the coil end portion 12. As illustrated in FIG. 7, each bent portion 121 is molded so as to be displaced by width W/2, which is half of a wire width W of the coil wire 1, in the radial direction of the stator core 200 (D3 direction illustrated in FIG. 7) with respect to the slot accommodating portion 11. As illustrated in FIG. 7, each top portion 122 is molded so as to be displaced by a width W, which is equal to the wire width W of the coil wire 1, in the radial direction of the stator core 200 (D3 direction).

Specifically, the coil end portion 12 connected to the lower end portion of the slot accommodating portion 11 is displaced by W/2 (+W/2) to the radial-direction outside of the stator core 200 (D31 direction side illustrated in FIG. 7) with respect to the slot accommodating portion 11 in the bent portion 121, and then obliquely extends toward the top portion 122. Next, the coil end portion 12 is displaced by 1W (−1W) to the radial-direction inside of the stator core 200 (D32 direction side illustrated in FIG. 7) in the top portion 122, and then obliquely extends toward the next bent portion 121, and is displaced again by W/2 (+W/2) to the radial-direction outside of the stator core 200 (D31 direction side illustrated in FIG. 7) in the bent portion 121. Therefore, (+W/2)+(−1W)+(+W/2) is equal to zero in total and the 48 slot accommodating portions 11 of the six coil wires 1 stacked side by side are disposed at the same position in the radial direction of the stator core 200 (D3 direction). In other words, even if one layer is constituted by the six coil wires 1 being stacked side by side, the part of the slot accommodating portion 11 has only a width corresponding to the width W of the coil wire 1.

Figure 10:
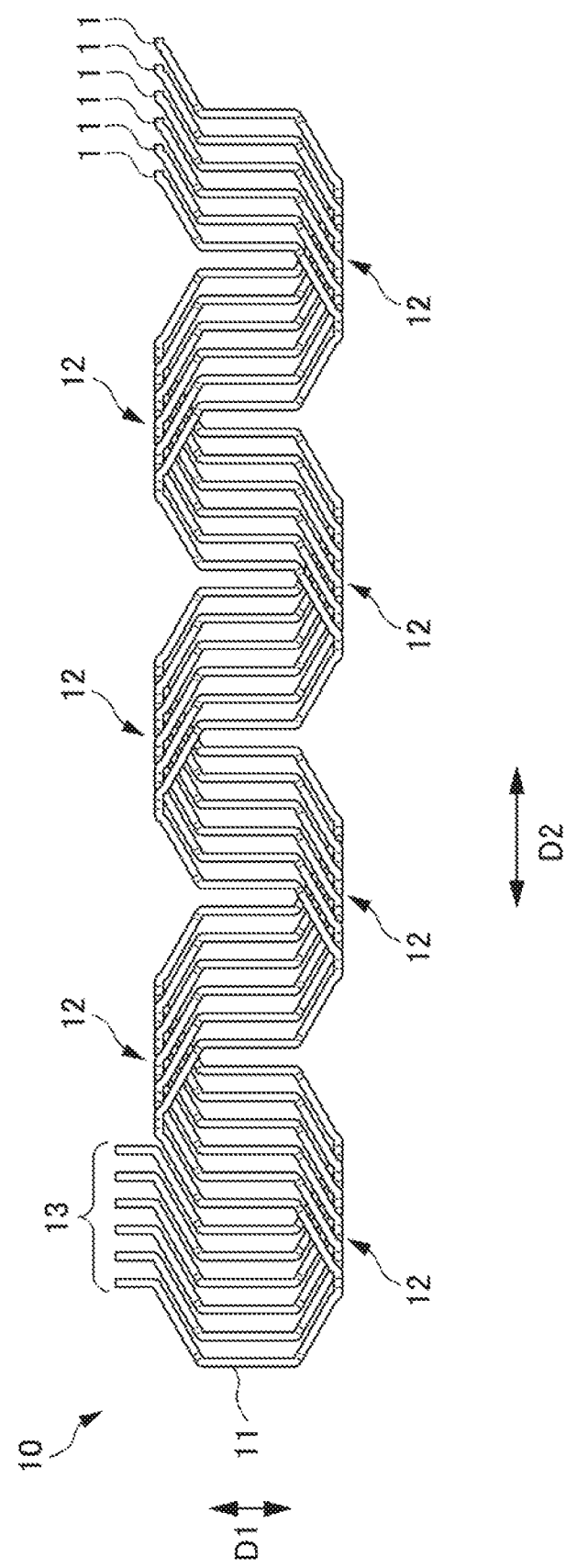
FIG. 10 is a diagram illustrating a state where six coil wires molded in the same wave shape constitute one layer by being sequentially stacked side by side.

Although not illustrated in FIGS. 8 to 10, the coil wire 1 of the present embodiment further extends along the circumferential direction of the stator core 200 (D2 direction), which is the arrangement direction of the slot accommodating portion 11, such that the slot accommodating portions 11 are disposed in parallel in the same manner. The six arranged coil wires 1 are alternately reversed and folded back in a zigzag manner as illustrated in FIGS. 3 and 5 with 48 slot accommodating portions 11 as one unit. In other words, as illustrated in FIGS. 3 and 4, the six coil wires 1 stacked side by side are folded back in the top portion 122 of the coil end portion 12 that corresponds between the 48th and 49th slot accommodating portions 11 from the end of the coil wire 1.

Figure 11:
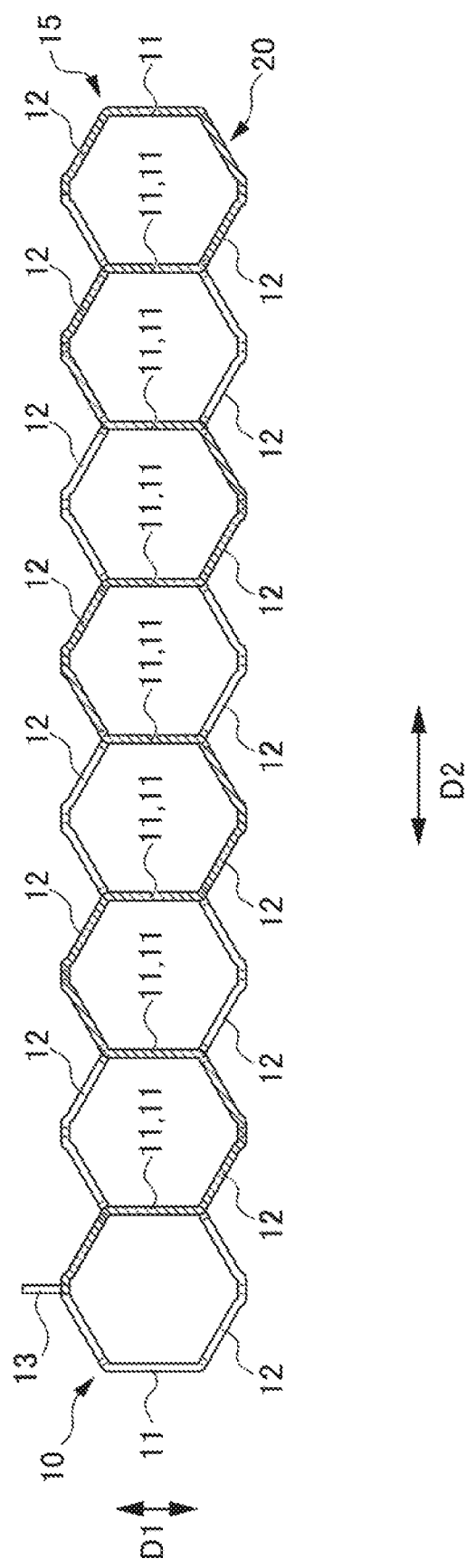
FIG. 11 is a diagram illustrating a state where one coil wire constituting the layer illustrated in FIG. 8 is folded back and another layer is stacked.

Illustrated in FIG. 11 is a state where a layer 20 is constituted by one coil wire 1 constituting the layer 10 illustrated in FIG. 8 being folded back. The folded part is indicated by hatching. The coil end portion 12 to be folded back constitutes a continuous wire-based connecting portion 15 which does not have a division portion and a joining portion over the layer adjacent in the stacking direction. In other words, the layers stacked by folding back are integrally connected by the continuous wire-based connecting portion 15. By the six coil wires 1 being sequentially reversed and folded back in a zigzag manner in the continuous wire-based connecting portion 15 in the same manner, the layer 20 is stacked on the layer 10, a layer 30 is stacked on the layer 20, a layer 40 is stacked on the layer 30, a layer 50 is stacked on the layer 40, and the layer 60 is stacked on the layer 50 as illustrated in FIGS. 3 and 5, and the sheet-shaped coil 100 with a six-layer structure before mounting in the stator core 200 is obtained.

By the six coil wires 1 being folded back in a zigzag manner and stacked in the connecting portion 15 in this manner, the slot accommodating portions 11 of the respective layers 10 to 60 are stacked in up to six layers in the radial direction. In the connecting portion 15, the radial displacement amount of the coil wire 1 is adjusted such that the slot accommodating portions 11 of the respective layers 10 to 60 are stacked with the slot accommodating portions 11 radially misaligned.

To be specific with respect to FIG. 7, the connecting portion 15 is similar to parts other than the connecting portion 15 in that a displacement of 1W (−1W) to the radial-direction inside of the stator core 200 (D32 direction side) occurs in the top portion 122 after a displacement of W/2 (+W/2) to the radial-direction outside of the stator core 200 (D31 direction side) with respect to the slot accommodating portion 11 in the bent portion 121 of the coil end portion 12, yet a re-displacement of W/2 (−W/2) to the radial-direction inside of the stator core 200 (D32 direction side) subsequently occurs in the connecting portion 15. Accordingly, (+W/2)+(−1W)+(−W/2) is equal to −1W in total and the layer folded back in the connecting portion 15 is shifted by 1W to the radial-direction inside (D32 direction side) with respect to the layer adjacent to the radial-direction outside (D31 direction side). As a result, the slot accommodating portions 11 of the layers 10 to 60 folded back in a zigzag manner overlap in the radial direction (D3 direction).

The obtained coil 100 is inserted into the center of the stator core 200 after rounded in an annular shape, and then is mounted in the stator core 200 by each slot 201 accommodating the slot accommodating portion 11 equivalent to six layers. The part of the slot accommodating portion 11 of the coil wire 1 equivalent to one layer has only the width W of one coil wire 1, and thus the width dimension of the part of the slot accommodating portion 11 (dimension along the radial direction of the stator core 200) does not have to exceed the width of six coil wires 1 (W×6) as illustrated in FIG. 7 even if six layers are stacked each with six coil wires 1, and the part can be compactly accommodated in the slot 201 in the stator core 200 as a result.

As described above, the coil 100 has a configuration in which the long coil wire 1 molded in a predetermined wave shape is stacked by being folded back in a zigzag manner, and thus the total length of the coil 100 that is yet to be annularly molded can be compact. Accordingly, the size of a transport device transporting the coil 100 can be reduced. In addition, the connecting portion 15 to be folded back has the continuous wire, and thus the layers 10 to 60 are not scattered in the connecting portion 15 and handling of the coil 100 is facilitated. Moreover, for mounting in the stator core 200, the coil wire 1 stacked in six layers has only to be rounded by one lap and does not have to be rounded in a substantially spiral shape unlike in the related art, and thus each coil wire 1 can be easily incorporated into the slot 201.

Figure 12:
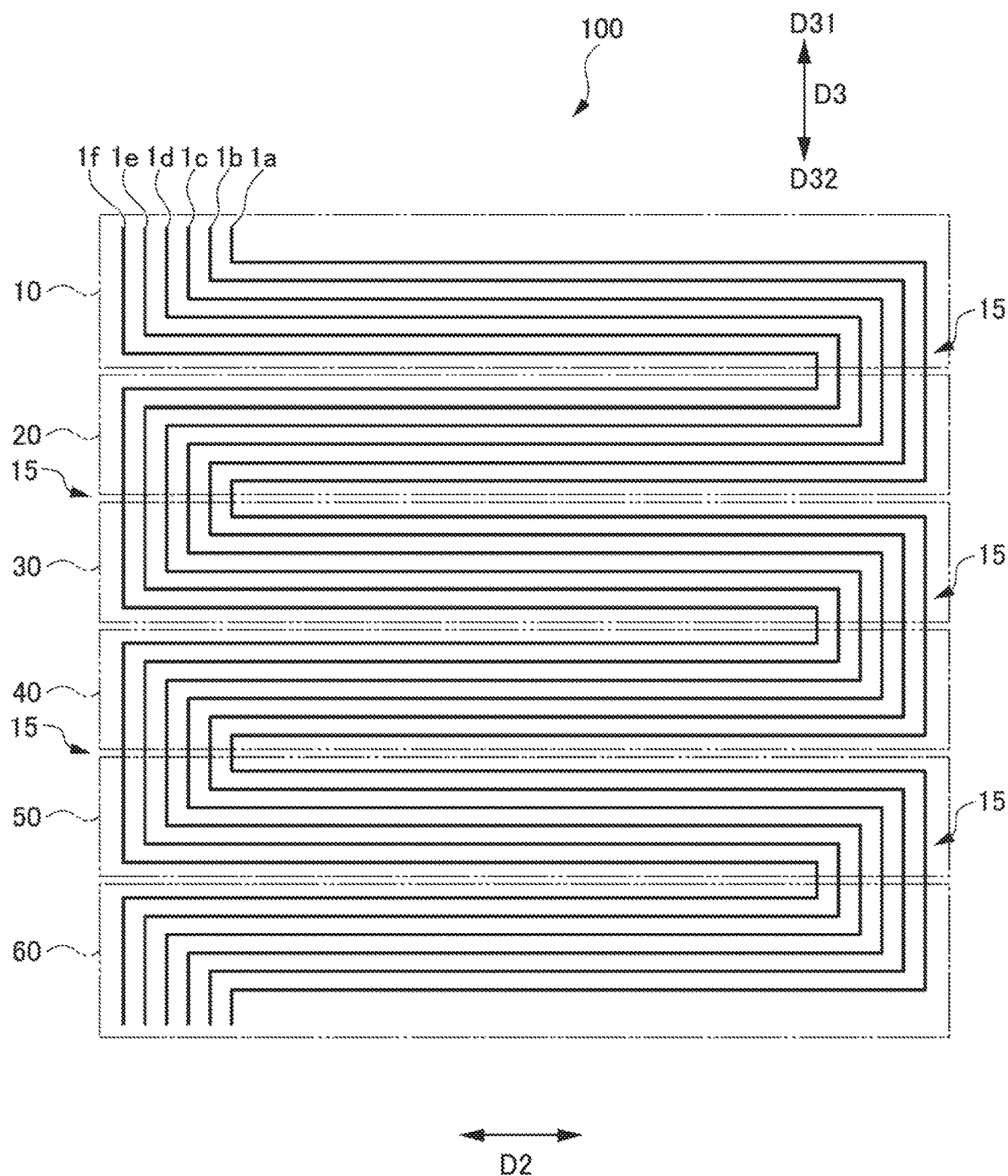
FIG. 12 is a diagram schematically illustrating the stacking structure of the coil for a rotary electric machine.

In the coil 100 of the present embodiment, the stacking direction of the six coil wires 1 between the adjacent layers, such as the layers 10 and 20 and the layers 20 and 30, is reversed, and the folding direction and the stacking direction of the six coil wires 1 correspond to each other in the connecting portion 15. This configuration will be further described with reference to FIG. 12. FIG. 12 is a diagram schematically illustrating the stacking structure of the coil 100 of the present embodiment. The upward-downward direction in FIG. 12 indicates the radial direction of the stator core 200 (D3 direction). Assuming that the six coil wires 1 are respectively coil wires 1a to 1f in the order of the stacking, the coil wires 1a to 1f are sequentially stacked along the radial direction of the stator core 200 (D3 direction). In other words, the coil wires 1a to 1f are sequentially stacked in the direction in which the stacking direction is from D31 to D32 from the coil wire 1a disposed on the farthest side to the coil wire 1f.

Focusing on the coil wire 1a, for example, the coil wire 1a is disposed on the outermost side of the connecting portion 15 in the connecting portion 15 when the layer 10 is folded back in the connecting portion 15 whereas the coil wire 1a is disposed on the farthest side in the radial direction (D31 direction side) in the layer 10. As a result, when the coil wire 1a is folded back, the coil wire 1a is disposed on the nearest side in the radial direction (D32 direction side) in the layer 20. In other words, each of the coil wires 1a to 1f is folded back in the connecting portion 15 while maintaining the stacking order in each layer, and thus the stacking direction is reversed to the direction from D32 to D31. The stacking order is maintained in the connecting portion 15. Accordingly, in the folding order of the coil wires 1a to 1f in each connecting portion 15, the layer that is on the farthest side (D31 direction side) in the immediately preceding layer (layer on the upper side in FIG. 12) is disposed outside and folded back. The stacking order reversal and the stacking order-maintained folding as described above are repeated for each connecting portion 15.

Figure 13:
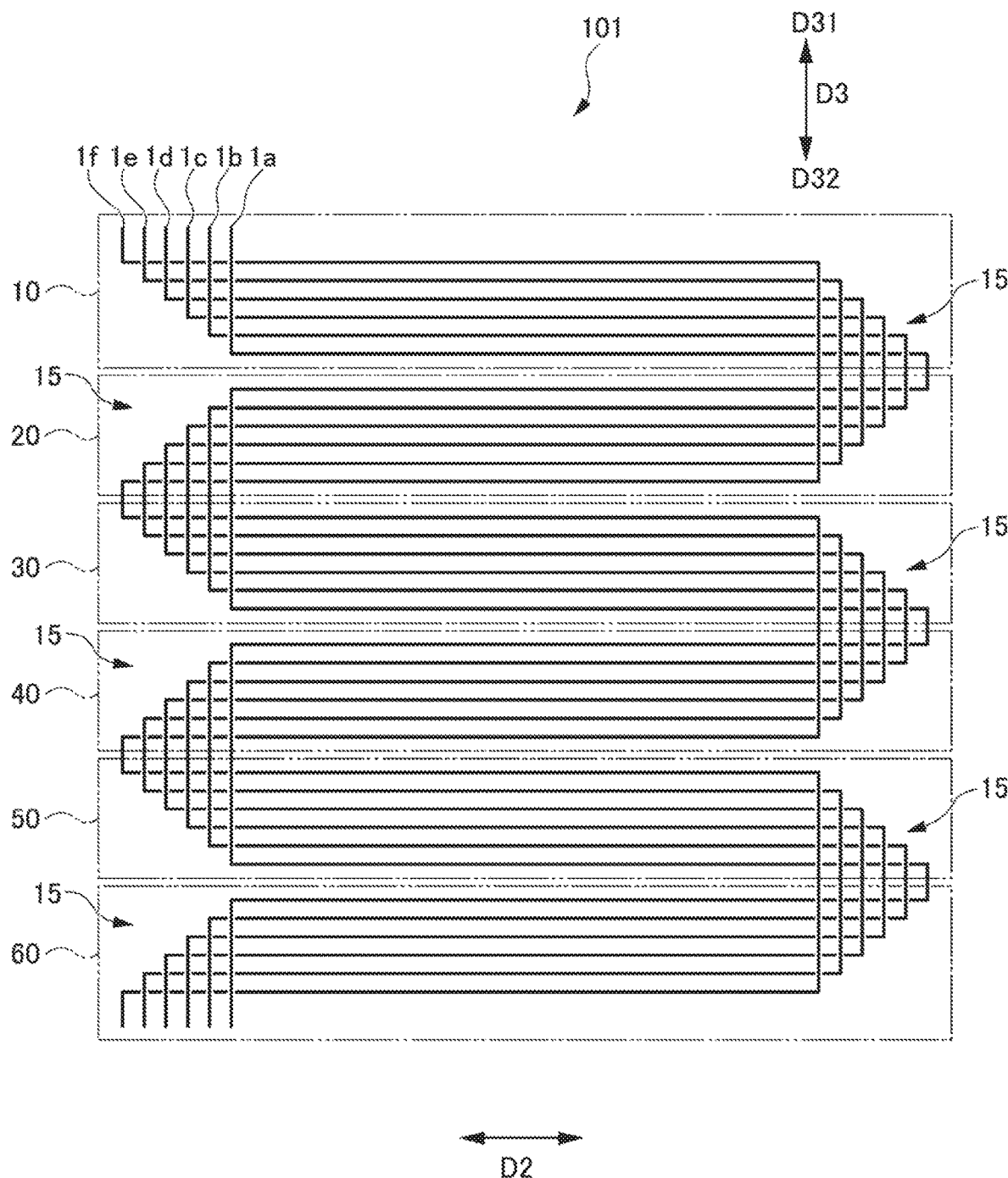
FIG. 13 is a diagram schematically illustrating the stacking structure of the coil for a rotary electric machine.

As a result, a wave winding coil stacked in a plurality of layers can be easily manufactured by sequential insertion of each previously folded coil wire 1 (1a to 1f) from the folding direction (direction along the D2 direction illustrated in FIG. 12). In other words, the coil 100 of the present embodiment is easily obtained by the six folded coil wires 1 (1a to 1f) being inserted with other coil wires 1 between the respective layers after each of the six coil wires 1 (1a to 1f) is individually molded into a folded shape. For example, in a case where folding is performed without the stacking order of six coil wires 1 between adjacent layers being maintained in the connecting portion 15 as in a coil 101 illustrated in FIG. 13, the coil wires 1a to 1f in each connecting portion 15 are woven together, and thus sequential insertion from the folding direction (direction along the D2 direction illustrated in FIG. 13) is impossible. Accordingly, it is difficult to manufacture a wave winding coil stacked in a plurality of layers.

When the coil 100 stacked in a sheet shape is rounded for mounting in the stator core 200, the diameter of the coil 100 decreases toward the radially inner layer 60 with respect to the layer 10 on the radial-direction outside of the stator core 200, and an inner-outer circumferential difference occurs as the length in the circumferential direction also decreases toward the radially inner layer 60. Accordingly, it is preferable to be capable of eliminating the inner-outer circumferential difference as follows.

Figure 14:
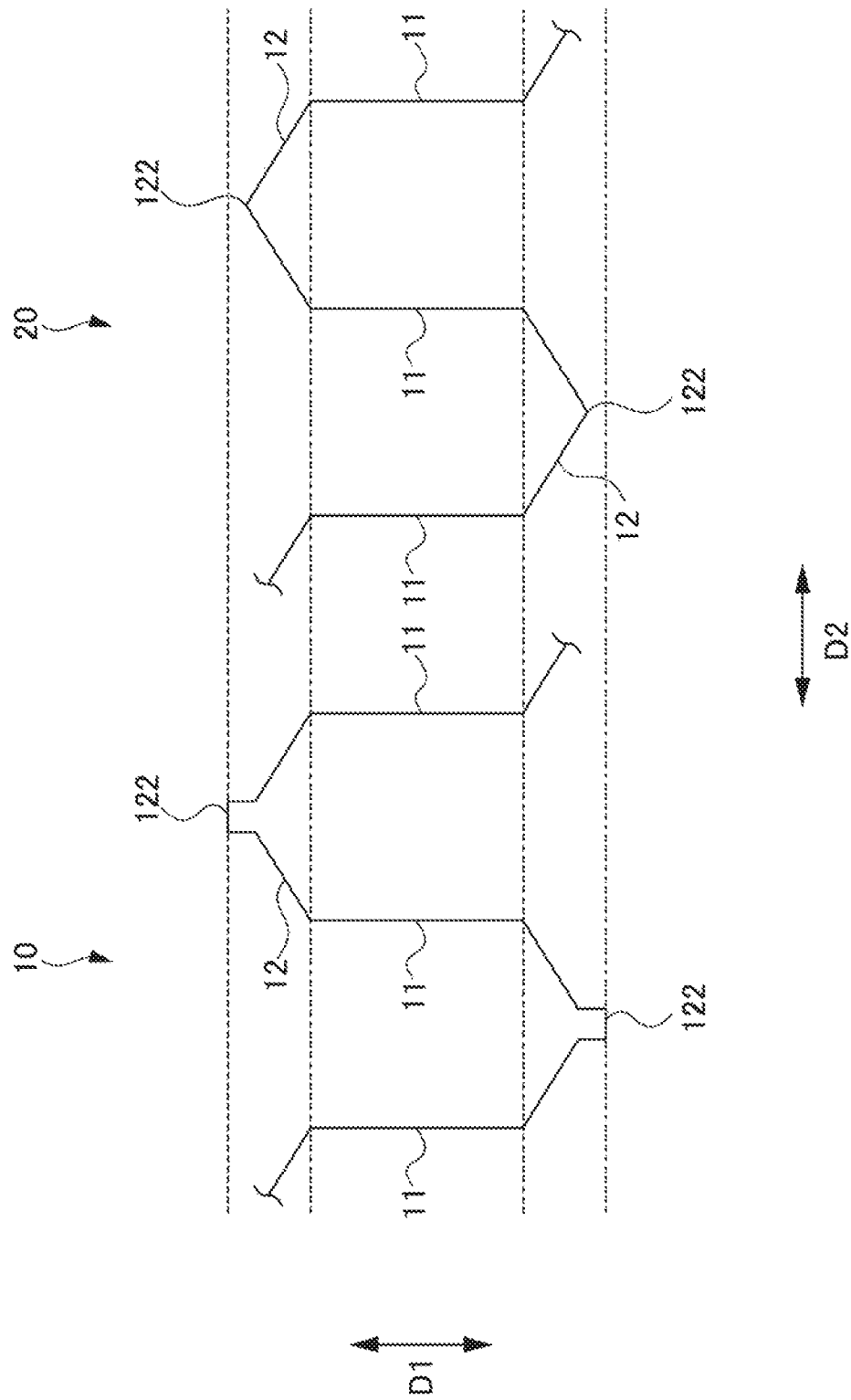
FIG. 14 is a diagram schematically illustrating a state where a part of the layer disposed on the radial-direction outside of the stator core and a part of the layer disposed on the radial-direction inside of the stator core are arranged side by side.
Figure 15:
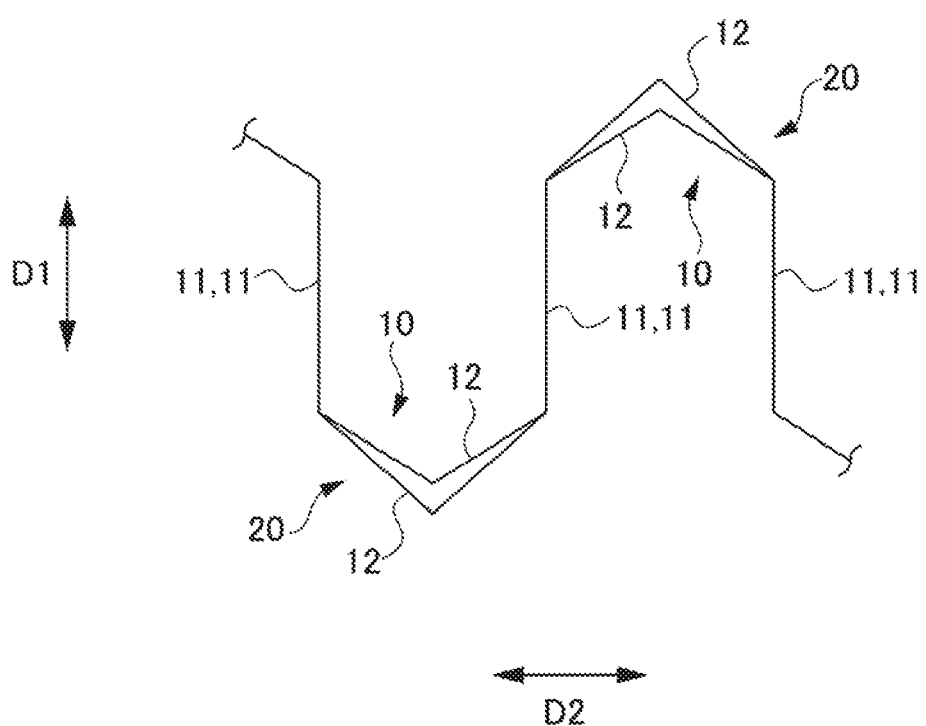
FIG. 15 is a diagram schematically illustrating a state where a part of the layer disposed on the radial-direction outside of the stator core and a part of the layer disposed on the radial-direction inside of the stator core are stacked.

FIG. 14 is a diagram schematically illustrating a state where a part of the layer 10 disposed on the radial-direction outside of the stator core 200 and a part of the layer 20 disposed on the radial-direction inside of the stator core 200 are arranged side by side. As illustrated in FIG. 14, the top portion 122 of the coil end portion 12 of the coil wire 1 constituting the layer 10 disposed on the radial-direction outside of the stator core 200 is molded so as to be higher in the axial direction of the stator core 200 (D1 direction) than the top portion 122 of the coil end portion 12 of the coil wire 1 constituting the layer 20 disposed on the radial-direction inside of the stator core 200. According to this, even if the intervals of the slot accommodating portions 11 of the respective coil end portions 12 before annular molding are the same, the coil end portion 12 can be further widened in the circumferential direction (D2 direction) by the top portion 122 formed to be high in the axial direction and by annular molding toward each coil wire 1 of the layer 10 disposed on the radial-direction outside of the stator core 200. Accordingly, the heights of the top portions 122 of the coil end portions 12 of the layer 10 disposed on the radial-direction outside of the stator core 200 and the layer 20 disposed on the radial-direction inside of the stator core 200 can be easily aligned during mounting in the stator core 200 even with the intervals of the slot accommodating portions 11 of the respective coil wires 1 evenly aligned in a molding stage for each coil wire 1. The other layers 30 to 60 are configured in the same manner as described above. In addition, the height of the top portion 122 may be changed by the inclination of the coil end portion 12 being changed as illustrated in FIG. 15.

Figure 16:
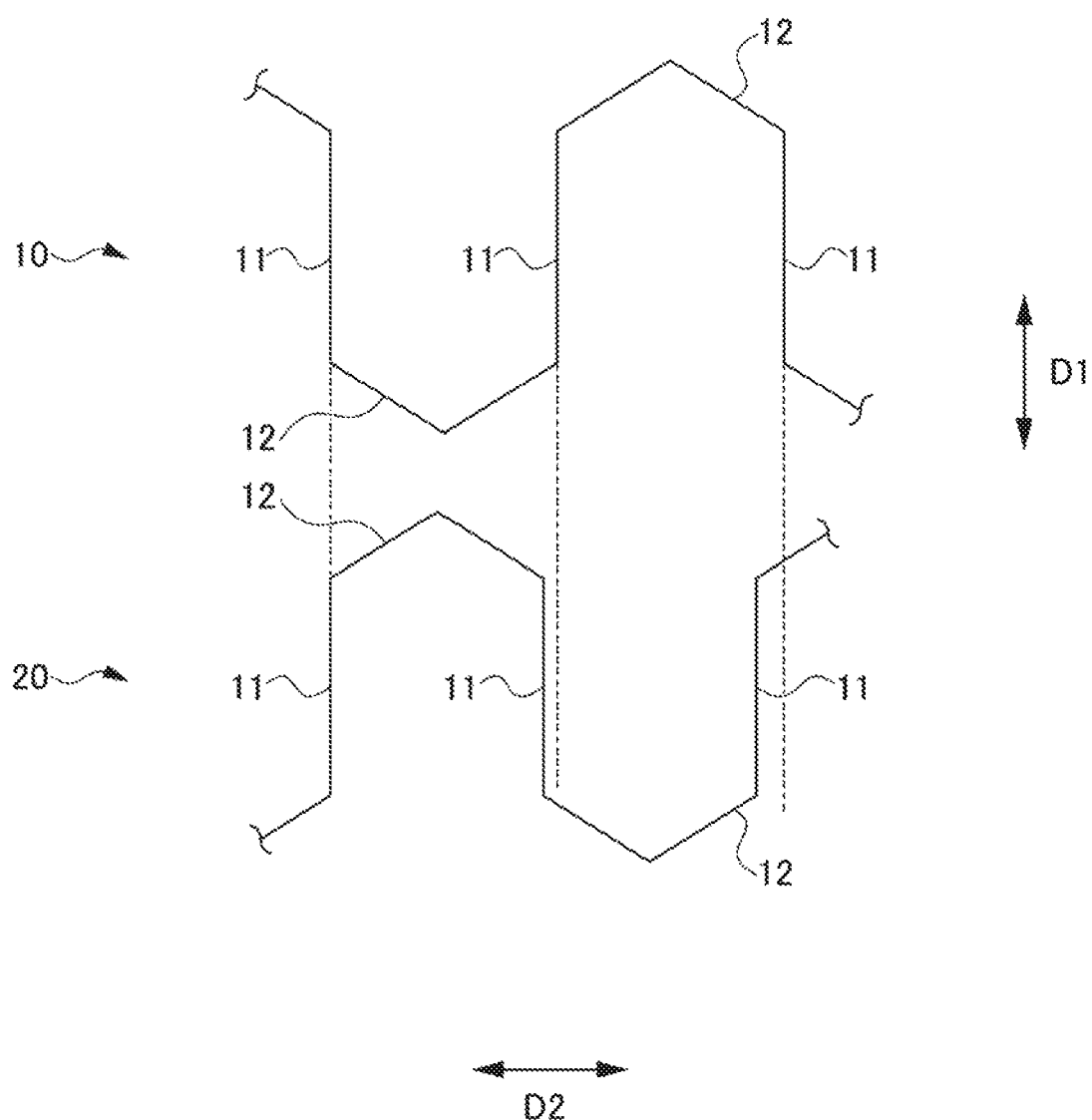
FIG. 16 is a diagram schematically illustrating a state where a part of the layer disposed on the radial-direction outside of the stator core and a part of the layer disposed on the radial-direction inside of the stator core are vertically arranged.

FIG. 16 is a diagram schematically illustrating a state where a part of the layer 10 disposed on the radial-direction outside of the stator core 200 and a part of the layer 20 disposed on the radial-direction inside of the stator core 200 are vertically arranged. As illustrated in FIG. 16, each coil wire 1 may be molded such that the interval between the adjacent slot accommodating portions 11 of the coil wire 1 is shorter in the layer 20 disposed on the radial-direction inside of the stator core 200 than in the layer 10 disposed on the radial-direction outside of the stator core 200. As a result, the circumferential lengths of the layer 10 disposed on the radial-direction outside of the stator core 200 and the layer 20 disposed on the radial-direction inside of the stator core 200 can be easily aligned, and the stator core 200 can be incorporated into the slot 201 with greater ease. The other layers 30 to 60 are configured in the same manner as described above. In addition, the above-described change in the interval between the slot accommodating portions 11 may be performed in conjunction with the change in the inclination of the coil end portion 12 and the change in the height of the top portion 122 described above.

Figure 17:
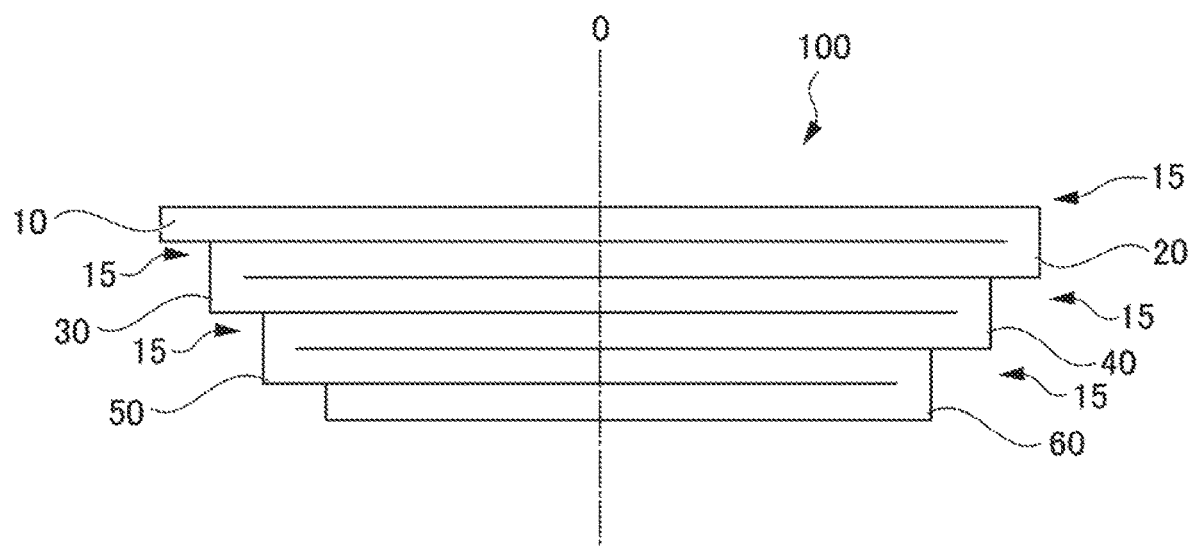
FIG. 17 is a diagram schematically illustrating a state where the central position of each layer of the folded coil wire is aligned.

In a case where the interval of the slot accommodating portion 11 is changed, molding may be performed such that the interval of the slot accommodating portion 11 in the vicinity of the coil end portion 12 constituting the folded part of the coil wire 1, that is, the connecting portion 15 is smaller than the interval of the slot accommodating portion 11 at parts other than the vicinity of the folded part of the coil wire 1. In other words, molding is performed such that the interval of the slot accommodating portion 11 in the vicinity of the coil end portion 12 constituting each connecting portion 15, which is the folded part, is small without a change in the interval of the respective slot accommodating portions 11 in the vicinity of the middle portions of the layers 10 to 60. According to this, the positions of the slot accommodating portions 11 in the vicinity of the middle portions of the layers 10 to 60 can be aligned, and thus central positions O of the layers 10 to 60 can be aligned in the folded coil wire 1 as illustrated in FIG. 17.

Figure 18:
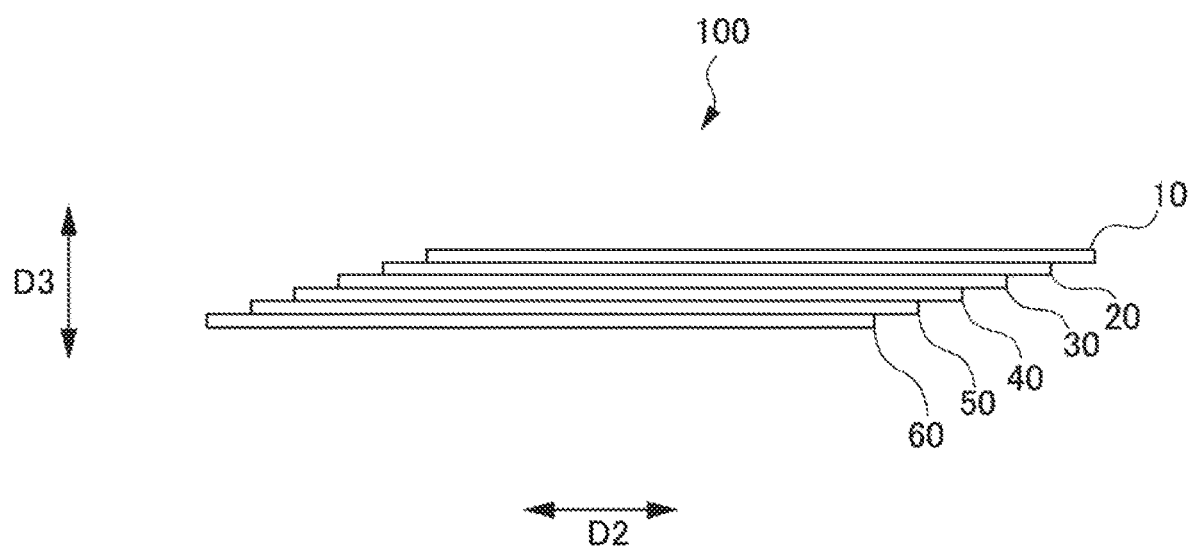
FIG. 18 is a diagram schematically illustrating a state where the coil wires are stacked by being folded back by shifting by a plurality of slots in the same direction along a circumferential direction of the stator core.
Figure 19:
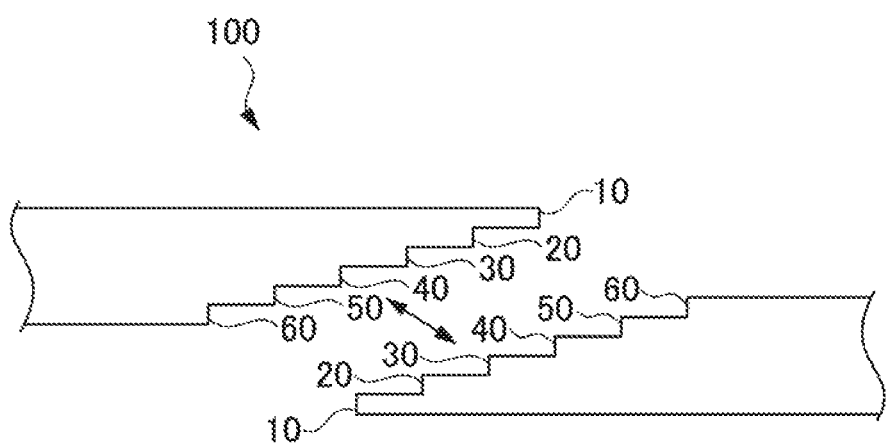
FIG. 19 is a diagram schematically illustrating a state where the coil illustrated in FIG. 20 is annularly molded.

As illustrated in FIG. 18, the layers 10 to 60 of the coil wire 1 constituting the coil 100 may be stacked by being folded back by shifting by a plurality of slots in the same direction along the circumferential direction of the stator core 200 (D2 direction). As a result, the end portion shape of the coil 100 becomes stepwise, and thus the end portions of respective layers 10A to 10F do not have to be woven when the coil 100 is annularly rounded and mounted in the stator core 200. Accordingly, annular molding can be facilitated by end portion overlapping alone as illustrated in FIG. 19, and the coil 100 can be incorporated with ease.

In the coil 100 of the present embodiment, each coil wire 1 is preferably a continuous wire that is continuous throughout the stacked layers 10 to 60. Since the entire coil 100 can be manufactured with one continuous wire, the number of joints can be minimized with no limitation and manufacturing processes for the coil 100 can be simplified.

Figure 20:
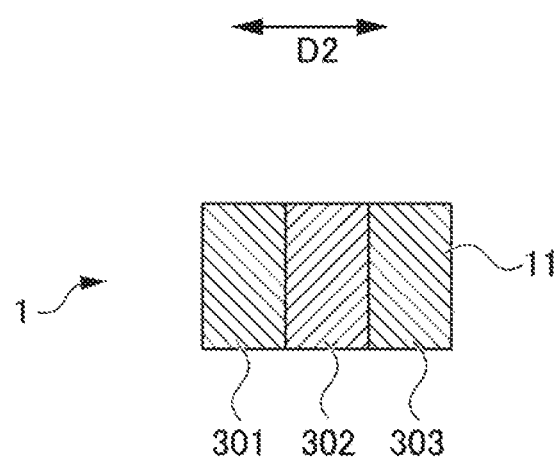
FIG. 20 is a cross-sectional view of a slot accommodating portion of the coil wire.

FIG. 20 is a cross-sectional view of one slot accommodating portion 11 of the coil wire 1. In this manner, it is preferable that a plurality of wires 301 to 303 divided in the circumferential direction of the stator core 200 (D2 direction) constitutes the rectangular wire-based coil wire 1. In other words, the coil wire 1 in this case is configured by stacking of the thin rectangular wire-based wires 301 to 303 along the circumferential direction of the stator core 200 (D2 direction). In this coil wire 1, displacement between the wires 301 to 303 can be facilitated, and thus the coil wire 1 can be deformed with ease when deformed such that the coil 100 is rounded and compressed to be inserted into the slot 201 of the stator core 200 and incorporation into the stator core 200 can be further facilitated. Although FIG. 20 illustrates an example in which the coil wire 1 is divided into the three wires 301 to 303, the number of divisions is not limited to three insofar as it is two or more.

The embodiment of the present invention can be appropriately modified or omitted within the scope of the invention. For example, the number of layers constituting the coil is not limited to six insofar as it is two or more. The number of coil wires constituting one layer is not limited to six.

EXPLANATION OF REFERENCE NUMERALS

100 COIL FOR A ROTARY ELECTRIC MACHINE
1 COIL WIRE
10 to 60 LAYER
11 SLOT ACCOMMODATING PORTION
12 COIL END PORTION
122 TOP PORTION
15 CONNECTING PORTION
201 SLOT
200 STATOR CORE
301 to 303 WIRE

What is claimed is:
1. A coil for a rotary electric machine mounted in a plurality of slots of a stator core having the slots in a circumferential direction, the coil comprising:
a plurality of sequentially stacked coil wires, wherein each of the coil wires defines an overlapping coil-type wave winding coil constituted by the coil wire having a plurality of slot accommodating portions accommodated in the slots and a plurality of coil end portions interconnecting the slot accommodating portions next to each other outside the slots in an axial direction of the stator core; and
a continuous wire-based connecting, portion that connects at least two layers of the sequentially stacked coil wires,
wherein the plurality of the coil wires are sequentially stacked such that a stacking order of the plurality of the coil wires between the at least two layers next to each other is reversed and the plurality of the coil wires are folded back with the stacking order maintained in the connecting portion.

2. The coil for a rotary electric machine according to claim 1, wherein a top portion of the coil end portion of the coil wire constituting the layer disposed on a radial-direction outside of the stator core is higher in the axial direction of the stator core than a top portion of the coil end portion of the coil wire constituting the layer disposed on a radial direction inside of the stator core.

3. The coil for a rotary electric machine according to claim 1, wherein an interval between the adjacent slot accommodating portions of the coil wire is shorter in the layer disposed on the radial-direction inside of the stator core than in the layer disposed on the radial-direction outside of the stator core.

4. The coil for a rotary electric machine according to claim 3, wherein the interval between the adjacent slot accommodating portions at the connecting portion is smaller than the interval between the adjacent slot accommodating portions at a part other than the connecting portion.

5. The coil for a rotary electric machine according to claim 1, wherein each layer of the coil wire is stacked by shifting by a plurality of slots in the same direction along the circumferential direction of the stator core.

6. The coil for a rotary electric machine according to claim 1, wherein the coil wire over each layer is a continuous wire.

7. The coil for a rotary electric machine according to claim 1, wherein wires divided in the circumferential direction of the stator core constitute the coil wire.

* * * * *